United States Patent [19]

Nakagawa et al.

[11] 4,074,354
[45] Feb. 14, 1978

[54] PROCESS CONTROL SYSTEM

[75] Inventors: Mutsuaki Nakagawa; Yutaka Wakasa; Hisayuki Uchiike; Susumu Nagata, all of Musashino, Japan

[73] Assignee: Yokogawa Electric Works, Ltd., Tokyo, Japan

[21] Appl. No.: 692,329

[22] Filed: June 3, 1976

[30] Foreign Application Priority Data

June 17, 1975 Japan .................................. 50-73426

[51] Int. Cl.² ............................................. G06F 3/04
[52] U.S. Cl. ................................................. 364/200
[58] Field of Search ....................... 340/172.5; 445/1; 235/151.11, 150.1, 150.01; 364/200

[56] References Cited

U.S. PATENT DOCUMENTS

| 3,779,457 | 12/1973 | Cornyn, Jr. et al. | 235/151.1 X |
| 3,896,871 | 7/1975 | Pecoraro et al. | 235/151.1 X |
| 3,947,665 | 3/1976 | Hundley | 235/150.1 |
| 3,976,981 | 8/1976 | Bowden | 340/172.5 |
| 3,984,665 | 10/1976 | Shriver et al. | 235/151.1 |

Primary Examiner—Harvey E. Springborn

Attorney, Agent, or Firm—Parmelee, Johnson, Bollinger & Bramblett

[57] ABSTRACT

A process control system of the type arranged to accept sensing signals from field sensing devices, to digitally process data represented thereby, and to supply control signals to field control devices. The system is characterized by a centralized maintenance backup system for supplying backup control signals to selected field control devices while their normal control signals are interrupted during servicing of various system components, e.g., signal conversion units. A maintenance backup device, centrally located at a control station, includes means for providing an adjustable backup control signal, a selector unit having jack terminals connected through prewired leads to a plurality of field control devices, and jack plug means for connecting the backup control signal means to a selected jack terminal and the field control device corresponding thereto. Servicing of circuit boards used, e.g., for signal conversion purposes, is facilitated by providing ready and simplified access to the different field control devices through the selector unit, and by utilizing data available at the system's central operating location to continue control of the field device in the manner prescribed by the digital processing unit.

6 Claims, 17 Drawing Figures

PROCESS CONTROL SYSTEM

BACKGROUND OF THE INVENTION

1. Field of the Invention

The present invention relates to process control systems and more particularly to arrangements for supplying backup control signals to field control devices when their normal control signals must be interrupted during servicing and maintenance.

2. Description of the Prior Art

In known process control systems, sensing signals are supplied from field sensing devices to a central data processor, which in turn supplies field control devices with control signals appropriate to maintain the process running in a desired manner. In the event of a failure in the circuits supplying control signals to the field devices or during routine maintenance, the control signals must be interrupted for servicing. In order to supply a backup signal during interruptions, process control systems have been supplied with a portable maintenance unit carried to the location where service is necessary and connected into the circuitry to supply a backup signal for as long as it takes to service the circuit. In many process control systems, however, the site where service is required is often far away from the central control station where the computer and display and indicator devices are installed to provide data showing how the process is, and ought to be, proceeding. In order to keep the process running in the desired manner, such data must be used to periodically modify and update the backup control signal. Moreover, the need for service is liable to arise anywhere in the control system, requiring the portable maintenance device to be moved from place to place. This has slowed servicing, and impaired process efficiency.

Because of the foregoing problems, known process control systems have not been entirely satisfactory in performing a maintenance function.

SUMMARY OF THE INVENTION

It is a principal object of this invention to provide a process control system with an improved maintenance system for supplying backup control signals to the field control devices while normal control signals to the field control devices are interrupted during servicing. Specific objects of the present invention are to provide a maintenance system which is easily used with a plurality of field control devices, which simplifies access to the devices, which does not require being transported to different locations in the field, which can make use of process data available at a central operating station, and which permits backup control signals to be readily adjusted and supplied to field control devices during maintenance and servicing. Still another object of the invention is to provide a maintenance system of the type described which is more suitable for practical, commercial use.

In a preferred embodiment of the invention to be described hereinbelow in detail, the process control system is characterized by a centralized maintenance backup means which preferably is located directly in the central operating station adjacent to process indicating and display devices. The maintenance backup means includes a means for providing an adjustable backup control signal, a selector unit having terminals, preferably jacks, connected through prewired leads to a plurality of field control devices, and means, such as a jack plug, for connecting the backup control signal means to a selected jack terminal and to the field control device corresponding thereto. Different field control devices thus may be easily accessed and given backup control from a central location during maintenance and servicing, with use of central processing data to provide minimum process disruption. In further aspects of the invention, the means providing the adjustable backup control signal includes an adjustable signal generator which may be switched into a first circuit having a balancing meter for measuring the magnitude of the backup control signal, or into a second circuit including the selected field control device. The second circuit preferably includes another meter which may be used to read the normal control signal for balancing of the backup control signal therewith. The prewired leads for each field control device include first and second leads from the control signal loop which are short circuited whenever their terminal in the selector unit is not connected to the backup control signal means.

Other objects, aspects and advantages of the invention will be pointed out in, or apparent from, the detailed description hereinbelow, considered together with the following drawings.

DESCRIPTION OF THE PREFERRED EMBODIMENT

Figure 1A:
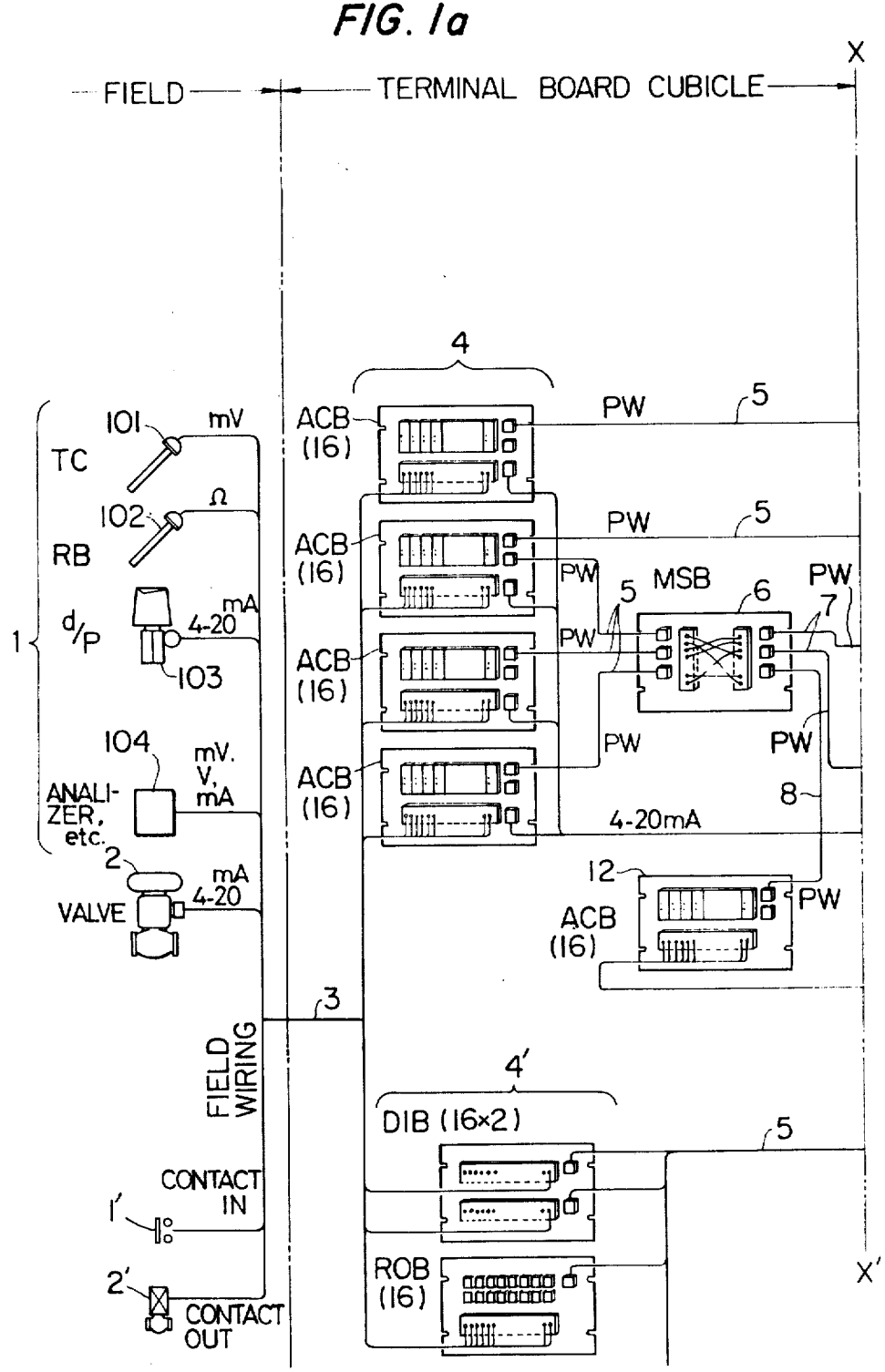
FIGS. 1a and 1b, when joined together at line x–x', schematically illustrate a process control system according to the present invention.
Figure 1B:
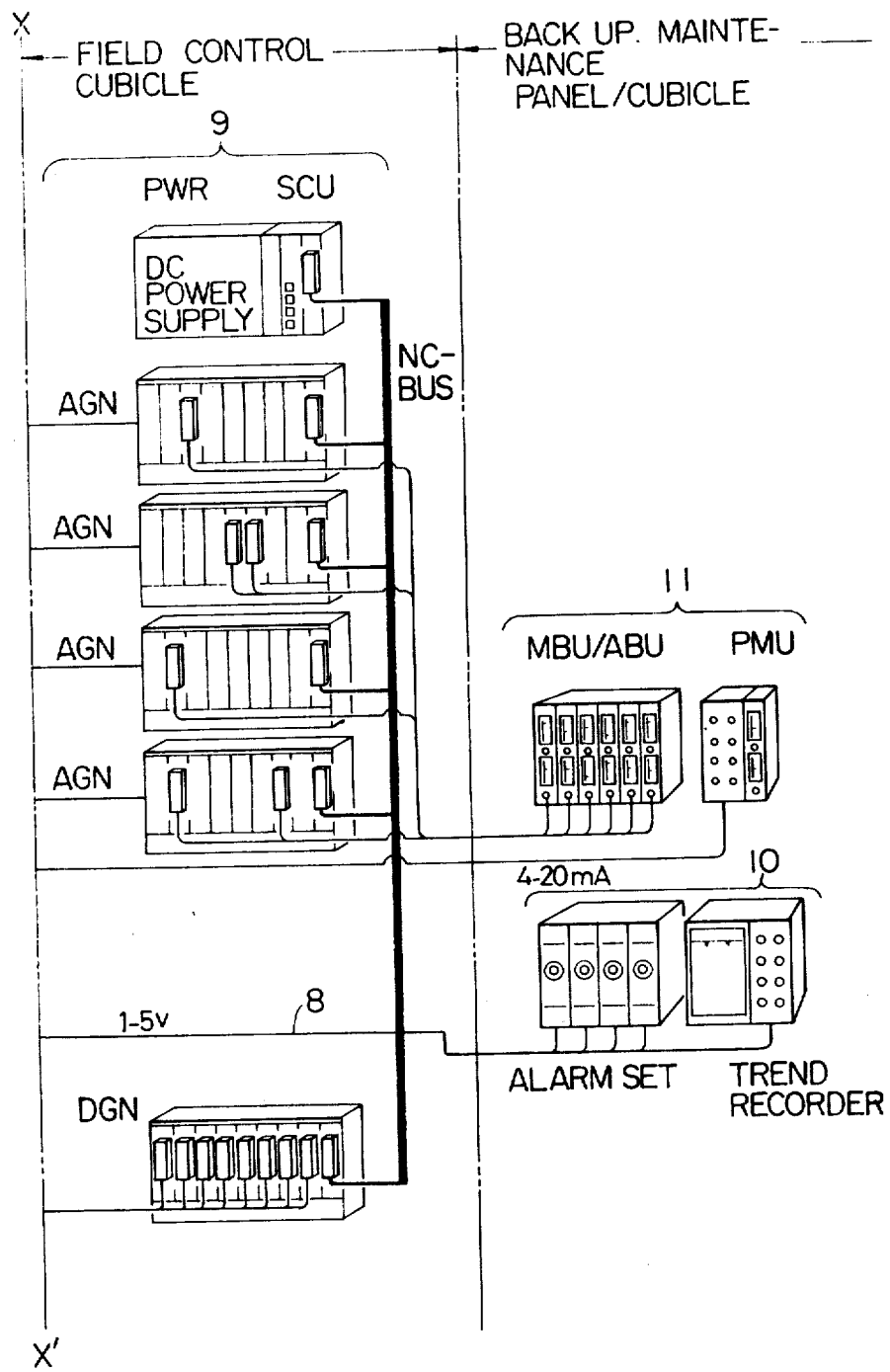

FIGS. 1a and 1b illustrate schematically a process control system constructed according to the present invention and arranged to exchange signals with field devices indicated generally as field sensing devices or detectors 1 and 1' and field control devices or responders 2 and 2'. Input and output signals are exchanged with the field devices on an input and output signal transmission line 3.

The process control system includes a signal converter 4 and a contact signal input and output device 4' connected to transmission line 3, intermediate signal-carrying cables 5 from signal converter 4, an editor 6 joining with cables 5, cables 7 and 8 from editor 6, a digital control device indicated generally at 9 and joining with cables 5 and 7, an analog processing device indicated generally at 10 and joining with cable 8 through a second signal converter 12, and an analog backup device indicated generally at 11 and including a centrally located maintenance device PMU in accordance with the present invention for supplying backup analog signals to a selected control device 2 during servicing of various system components.

The field sensing devices 1 supply varied analog input signals and comprise, for example, process detection devices such as a thermocouple 101, a resistance thermometer bulb 102, a differential pressure transmitter 103, and an analyzer 104, which generate analog signals measured in millivolts, ohms, milliamperes and volts respectively. The field sensing device 1' detects the status of a process and generates an on-off input signal. The field control device or responder 2, e.g., a flow control valve, manipulates a given process point according to an analog output signal from the control system. Similarly, a contact output signal operates field control device 2', e.g., a solenoid operated valve. The output signal supplied to the flow control valve 2 is in the form of a DC current in milliampere units, and that supplied to the solenoid operated valve 2' is an on-off signal.

The signal converter 4 converts the varied forms of analog input signals received from field sensing devices 1 and 1' into a standard form of intermediate signal representing physical quantities in a standardized range. The signal converter 4 also converts control signals, given in terms of the standard intermediate signal, into output analog signals in forms suited for the field control devices 2. Preferably, as set forth in copending U.S. patent application Ser. No. 618,268, filed Sept. 30, 1975, the intermediate signal is one representing data as a function of time duration, i.e., one carrying data on its time axis, such as a pulse-width signal, a pulse-number signal, or a frequency signal. In the illustrated embodiment, a pulse-width signal is selected for the intermediate signal for explanatory simplicity.

Figure 2:
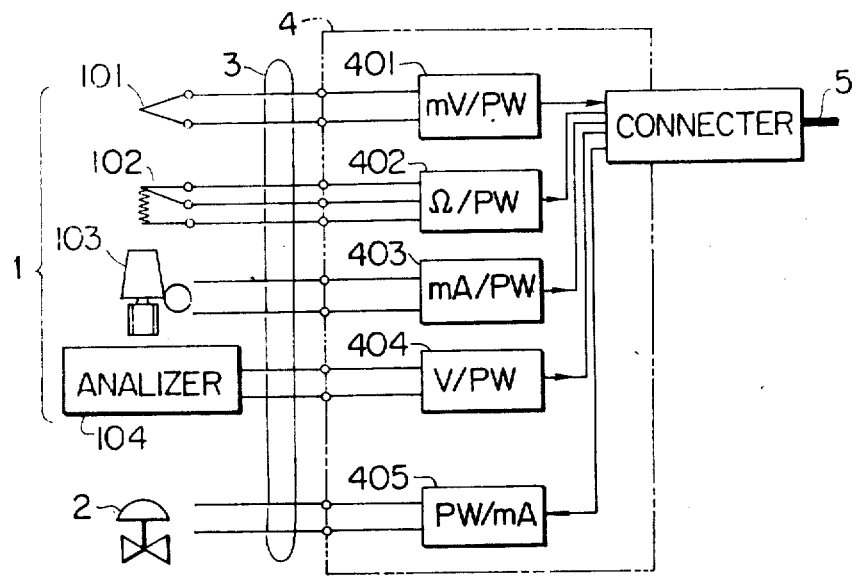
FIG. 2 is a schematic diagram showing the analog-to-intermediate signal converter 4 of FIG. 1.

As shown in FIG. 2, the signal converter 4 comprises individual converter units which vary according to the form of field input and output signals they are to handle. One unit block ACB of the signal converter 4 may comprise, for example, a low voltage to pulse-width converter unit 401 for thermocouple 101, a resistance to pulse-width converter unit 402 for thermometer bulb 102, a current to pulse-width converter unit 403 for pressure transmitter 103, a voltage to pulse-width converter unit 404 for analyzer 104, and a pulse-width to current converter unit 405 for flow control valve 2. Circuits capable of converting a voltage into a pulse-width signal are well known as a major constituent element of the integrating A/D converter, and it is also well known that current or resistance signals can easily be converted into voltage signals in a standardized range. With these techniques, the converter units 401 to 404 are arranged to convert low-voltage, resistance, current and voltage signals into the individual pulse-width signals varying duration in a standardized range. The pulse-width to current converter unit 405 operates, for example, by turning a constant voltage source on and off with the pulse-width signal, and by smoothing or time-averaging the resultant on-off current. As described below in relation to FIGS. 3 and 4, an isolation means is provided in the intermediate signal stage of each of the converter units 401 to 405. Isolation is readily accomplished at this stage with a transformer or a photocoupler since the intermediate pulse-width signal carries data on its time axis. Thus the process or field side of the system can be easily isolated from the control side of the system.

Figure 3:
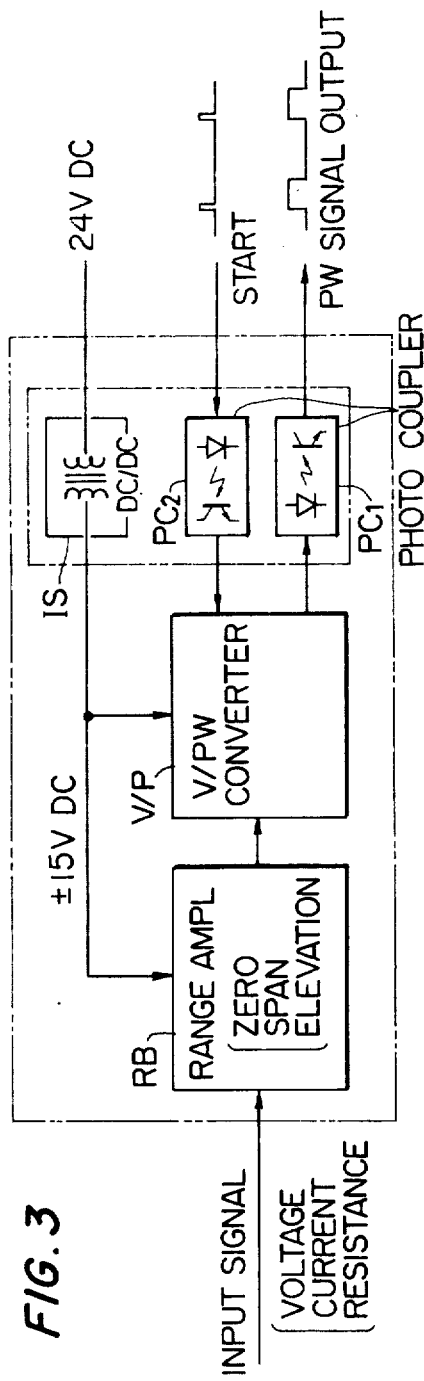
FIGS. 3 and 4 are schematic diagrams of individual converter units of the signal converter of FIG. 2.
Figure 4:
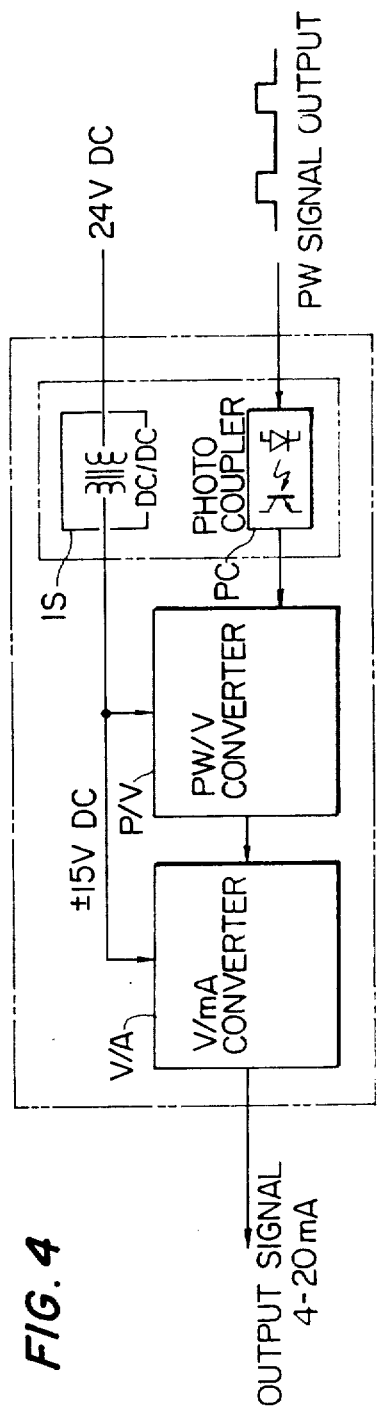

FIGS. 3 and 4 show in block form the fundamental construction of input signal converter units 401 to 404 (FIG. 3) and output signal converter unit 405 (FIG. 4). In the input signal converter unit shown in FIG. 3, an analog input signal is first converted into a voltage signal varying its amplitude in a standardized range by a range circuit RB and this voltage signal is then converted into a pulse-width signal by a pulse-width converter circuit V/P. The pulse width signal is available as an output through an isolating photocoupler $PC_1$ whenever a timing signal is received through an isolating photocoupler $PC_2$ by the pulse-width converter circuit V/P. The range circuit RB and the voltage to pulse-width converter circuit V/P are supplied with power through an isolator IS which comprises a DC/DC converter.

In the output signal converter unit shown in FIG. 4, a pulse-width signal from the control side of the system is supplied to a pulse-width to voltage converter circuit P/V through an isolating photocoupler PC and is first converted into an analog voltage signal, which is then converted into, e.g., a current signal in a desired range by a voltage to current converter circuit V/A. The pulse-width to voltage converter circuit P/V and the voltage to current converter circuit V/A are supplied with power through an isolator IS.

As can be seen from the foregoing description of the signal converter units, the analog signal system is distinctly isolated from the digital control (pulse) signal system both electrically and mechanically. This contributes much to simplifying design, production process, and services. Each converter unit can be built on a printed circuit board, and the individual converter units can be oriented to the appropriate portions of the input and output signal transmission line 3. This makes it possible to readily identify a particular converter unit and its corresponding signal line in the transmission line 3.

The intermediate pulse-width signal terminals of the converter units 401 to 405 converge at a connector (FIG. 2) and are connected to either the digital control device 9 or to the editor 6 by means of cable 5. Since the amplitude level of the intermediate pulse-width signals may be equivalent to the amplitude of a signal normally handled in digital logical devices, the connector and the cable 5 may be of a kind and quality normally considered suitable in such logical devices.

As shown in FIGS. 1a and 1b, the editor 6 is connected to the digital control device 9 and the second signal converter device 12 through cables 7 and 8 respectively, and the signal converter 12 is connected to the analog processing device 10 through cable 8. In the illustrated embodiment, the analog processing device 10 is shown as a monitor comprising an alarm set and a trend recorder. The purpose of editor 6 is to edit paths of intermediate signals which are to be transmitted between the signal converter device 4 and either the digital control device 9 or the analog processing device 10. Although this edition work may be done by varying jumper connections, it can more efficiently be done in the present system by the use of a digital logical circuit because a digital logical circuit can efficiently manage the pulse-width signals whose transmission paths are to be edited.

Figure 5:
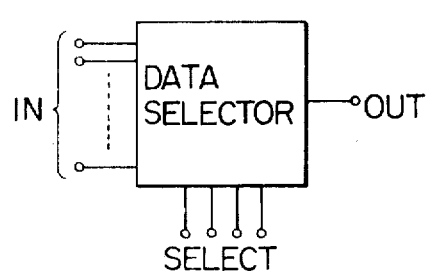
FIGS. 5 and 6 are schematic diagrams of devices suitable for the editor 6 of FIG. 1.
Figure 6:
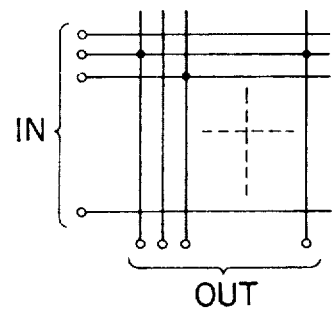

Accordingly, the editor 6 may comprise either a data selector (FIG. 5) or a matrix (FIG. 6), arranged to select the necessary one out of a plurality of input signal paths and to connect it to a selected output path to the following stage, thereby facilitating signal path linking, branching and joining, with the result that the efficiency of signal transmission path edition is enhanced.

Figure 7A:
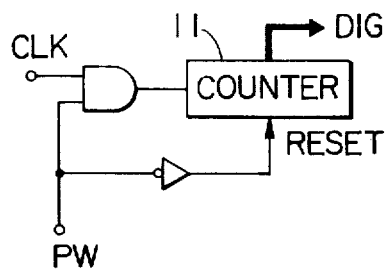
FIGS. 7a and 7b are schematic diagrams of circuits for digital interface devices, providing intermediate-to-digital signal conversion, and digital-to-intermediate signal conversion.
Figure 7B:
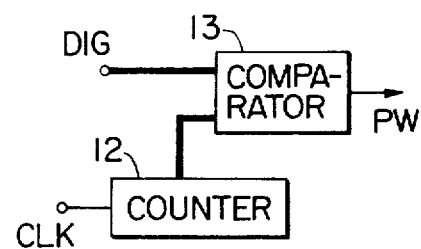

The intermediate pulse-width signal of the present invention is one readily compatible to conversion to and from a digital signal, as well as to and from an analog signal. For example, as shown in FIG. 7a, the duration of a pulse-width signal PW may be measured by a counter 11 receiving a train of clock pulses passed from a terminal CLK through an AND gate enabled by the pulse-width signal. The resultant counter output is a digital signal DIG. Conversion from a digital signal to an intermediate signal may be done with a circuit such as the one shown in FIG. 7b, in which the value of a digital signal DIG is compared with the uniformly increasing count value in a clock pulse counter 12 by a comparator 13. The resultant comparator output is an intermediate pulse-width signal PW.

Figure 8A:
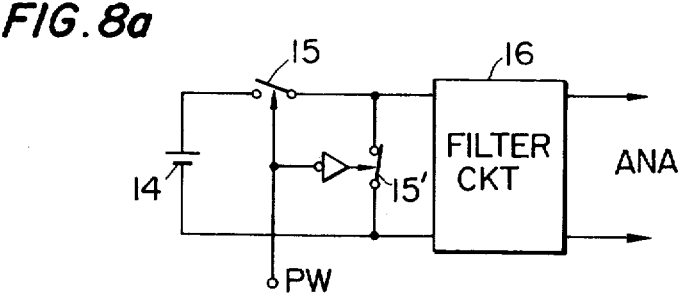
FIGS. 8a and 8b are schematic diagrams of circuits providing intermediate-to-analog signal conversion.
Figure 8B:
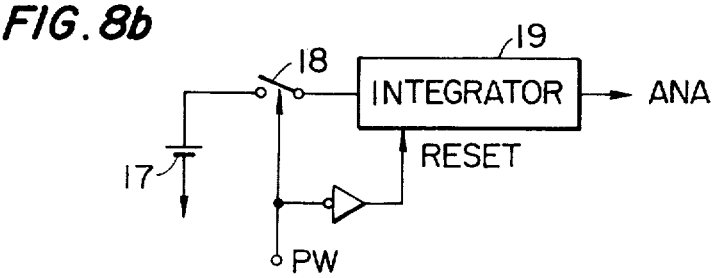

An intermediate pulse-width signal may be converted into an analog signal, e.g., by means of the circuits shown in FIGS. 8a and 8b. In the circuit shown in FIG. 8a, a voltage from a constant voltage source 14 is connected to a smoother or filter circuit 16 by serial switches 15 and 15' which are switched on and off by an intermediate pulse-width signal PW. Alternatively, in the circuit shown in FIG. 8b, a voltage from a constant voltage source 17 is connected to an integrator 19 by a switch 18 which is switched on and off by a pulse-width signal PW. The resultant output from either circuit is an analog signal ANA. The circuit shown in FIG. 8a is suited for applications where the pulse-width signal repeats periodically in a given cycle, and the one shown in FIG. 8b is suited for applications where the pulse-width signal does not steadily repeat. As mentioned before, an analog signal is converted into a pulse-width signal by the use of a pulse-width converter circuit of the type used in integrating A/D converters. Because conversion from an intermediate pulse-width signal into either a digital signal or an analog signal, or vice versa, can readily be made, the editor 6 can be connected to both the digital control device 9 and the analog processing device 10. Similar conversion from the intermediate pulse-width signal to an analog signal and vice versa is done by the second signal converter device 12, which is constructed the same as the signal converter device 4, previously described.

When the intermediate signal is a rate signal such as a pulse number or frequency signal, conversion from the rate signal to an analog signal and vice versa is accomplished through the use of known means such as V/F converters or F/V converters.

Figures 9, 10:
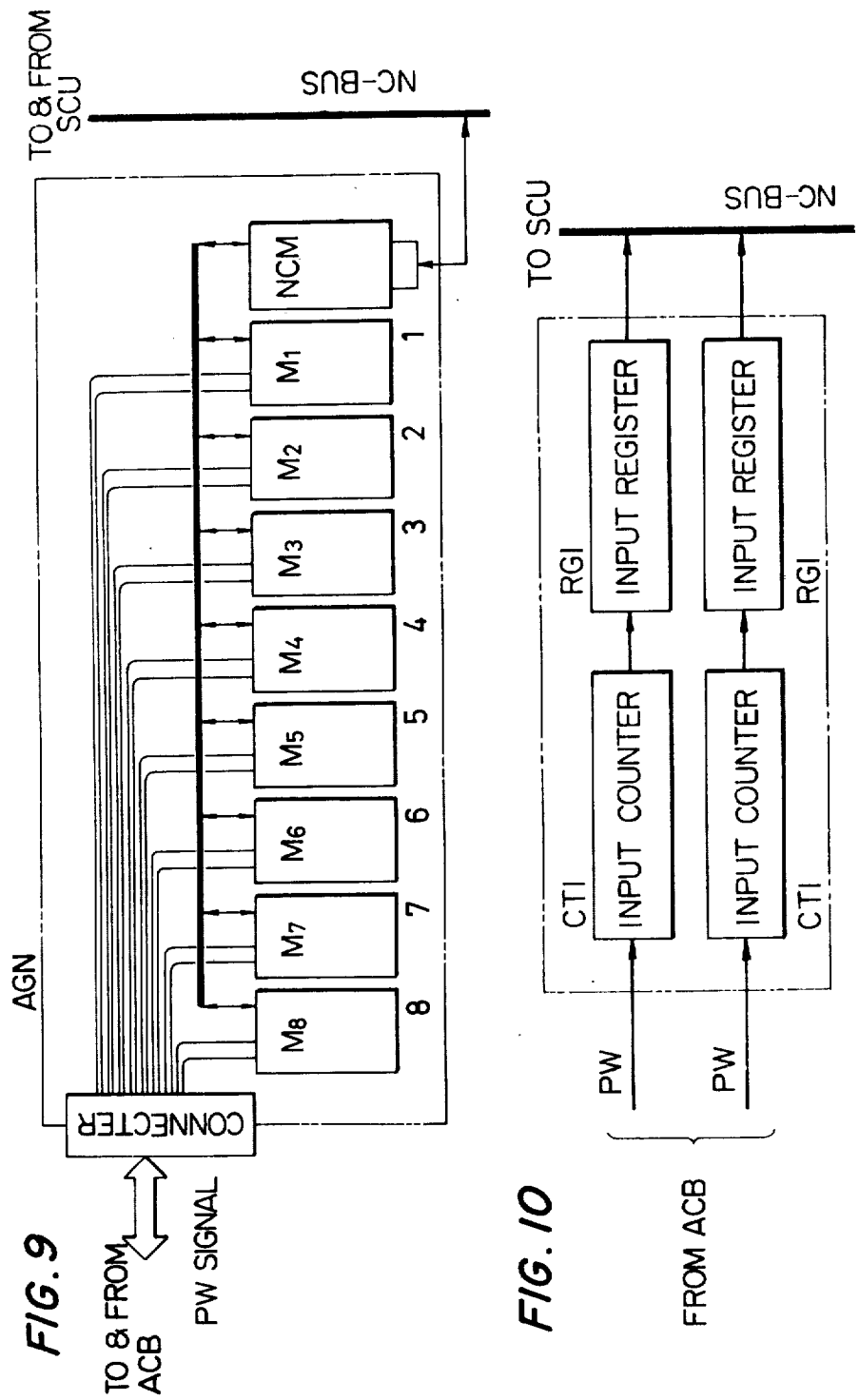
FIG. 9 is a schematic diagram of signal converting means in digital control device 9.

The digital control device 9, as shown in FIG. 1b, is arranged with a control unit SCU, a power source PWR, converters AGN to convert between intermediate and digital signals and a digital converter DGN. The control unit SCU is connected to the analog converters AGN and digital converter DGN by an NC bus. The control unit SCU is substantially a digital computer of a type such as a microcomputer. As shown in FIG. 9, the converter AGN consists of a plurality of modules NCM, and $M_1$ to $M_8$ for managing pulse-width signals. Conversion from a pulse-width signal to a digital signal and vice versa is made, e.g., by means of the circuits of FIGS. 7a and 7b, in the modules $M_1$ to $M_8$ which are connected to the NC bus through the common module NCM. The modules $M_1$ to $M_8$ are arranged as either input modules, shown in FIG. 10, or as input and output modules, shown in FIG. 11.

The input module of FIG. 10 comprises two input counters CTI (e.g., similar to counters 11 in FIG. 7a) for counting the width of the input intermediate signal pulse, and two input registers RGI for holding the counted values. The data in the input registers is available to be supplied as an output digital signal corresponding to the value of the input analog signal, and can be read at any time by the control unit SCU through the NC bus.

Figure 11:
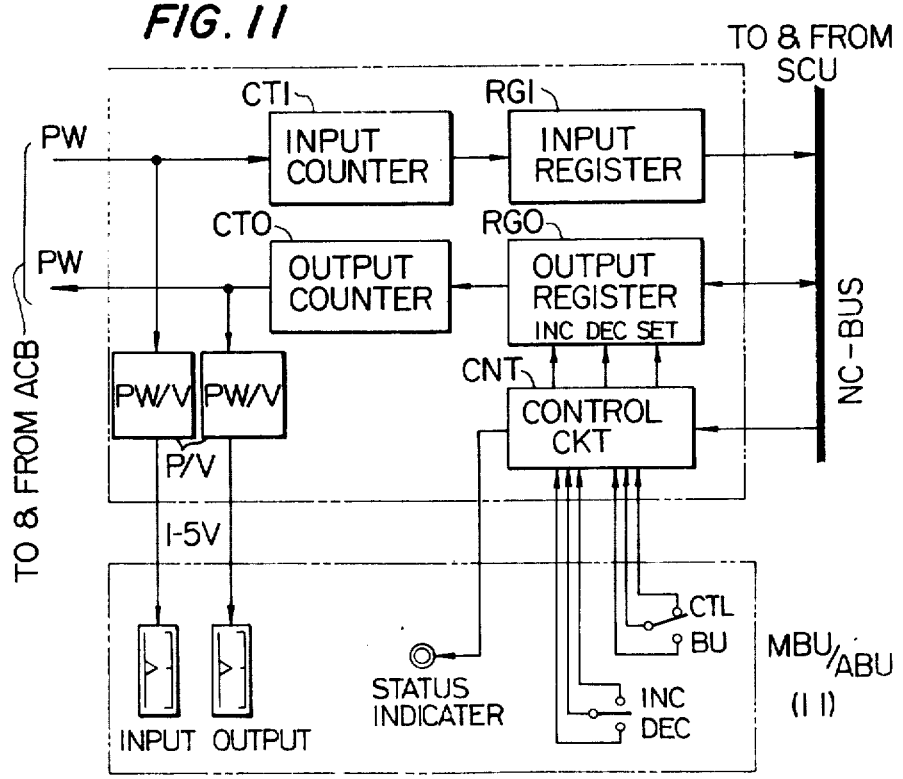
FIGS. 10 and 11 are schematic diagrams of modules used in the signal converters of FIG. 9.

The input and output module shown in FIG. 11 comprises both an input system and an output system. The input system comprises an input counter CTI for counting the width of the input signal pulse, and an input register RGI for holding the counted value. The output system comprises an output register RGO for holding a digital signal from the control unit SCU, and an output counter CTO (e.g., similar to counter 12 of FIG. 7b) for converting the digital signal into a pulse-width signal. This input and output module is operated when the input signal and the output signal are a pair of input and output signals at a controlled element in a process. Through the output system of this module, the digital signal which is supplied from the control unit SCU via the NC bus is converted into an intermediate pulse-width signal. Thus the control unit SCU controls the converter AGN and its group of input and output modules, thereby controlling input and output of pulse-width signals.

The data stored in the output register RGO may be modified by a manual/automatic backup unit MBU/ABU in the analog backup device 11 acting through the control circuit CNT. Backup modification is applied only to the necessary point in a system under control and is accomplished either automatically or manually according to the values of the input signal and the output signal provided to the backup device 11 through the pulse-width to voltage converters P/V in the module. Thus backup is available either automatically or manually. The backup unit MBU/ABU may be realized with elements commonly known in the field of analog automatic control.

Figure 12:
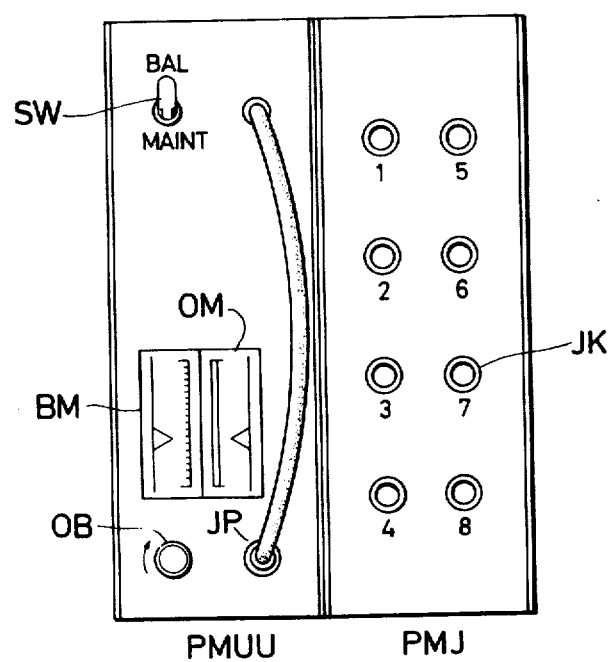
FIG. 12 illustrates a maintenance device according to the present invention.

The analog backup device 11 also includes a maintenance backup unit PMU used in the event of field maintenance or servicing of system components such as the signal converter units. In accordance with the present invention, the maintenance backup unit PMU is centrally located adjacent the backup unit MBU/ABU, e.g., at an operator's station, is selectively connected through prewired leads to the desired output signal converter unit in the signal converter device 4, and is operated as a standby to generate an output analog signal to a field control unit or responder 2 while usual signal paths are interrupted during maintenance or servicing. As shown in FIG. 12, the maintenance unit PMU comprises a maintenance signal control unit PMUU and a jack selector unit PMJ. The maintenance signal control unit PMUU is equipped with an output signal adjustment dial OB, an output meter OM, a balance meter BM, a switch SW, and a jack plug JP. The jack selector unit PMJ is equipped with 8 jacks JK each connected through prewired leads to a different signal converter unit output. The jack plug JP can be plugged in the desired jack on the jack unit PMJ for selection of a desired control unit 2 to send signals to.

Figure 13:
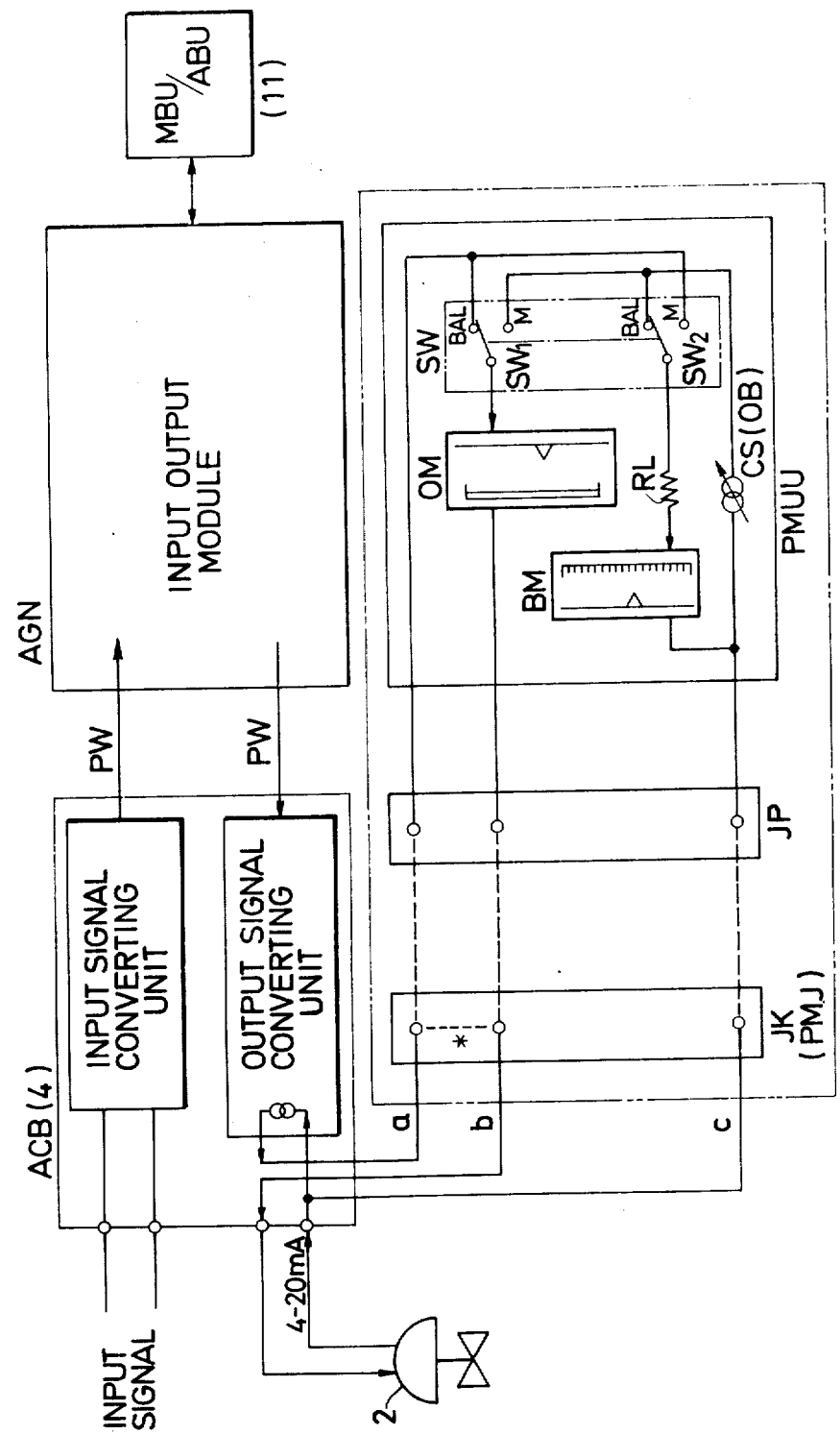
FIG. 13 is a schematic diagram of the maintenance device of FIG. 12 showing interconnections with other portions of the process control system.

Electrical connections in the maintenance unit PMU are shown in FIG. 13, which illustrates connections for a single jack, the connections for the other jacks being similar. The individual jacks JK of the jack unit PMJ are connected to three lines a, b and c, respectively, led from the current output terminals of a particular signal converter unit in the signal converter device 4. The circuit across leads $a$ and $b$ becomes opened whenever the jack plug JP is plugged in the jack JK and shorted whenever the plug JP is unplugged. In the maintenance signal control unit PMUU, the output signal adjustment dial OB is connected to a variable DC current source CS so that the current of the DC source CS may be adjusted by the output dial OB. When the ganged contacts SW1 and SW2 of a twin switch SW are thrown to the BAL side, the current from the DC source CS is supplied through a dummy resistor RL to the balance meter BM. At the same time, the current from the output signal converting unit is supplied to the operating meter OM. When the switch SW is thrown to the M side, the current from the DC source CS is supplied through the jack plug JP and output meter OM to lead 6 and controlled device 2. At the same time, the output circuit from the signal converting unit is supplied through leads $a$ and $c$ to balance meter BM.

Figure 14:
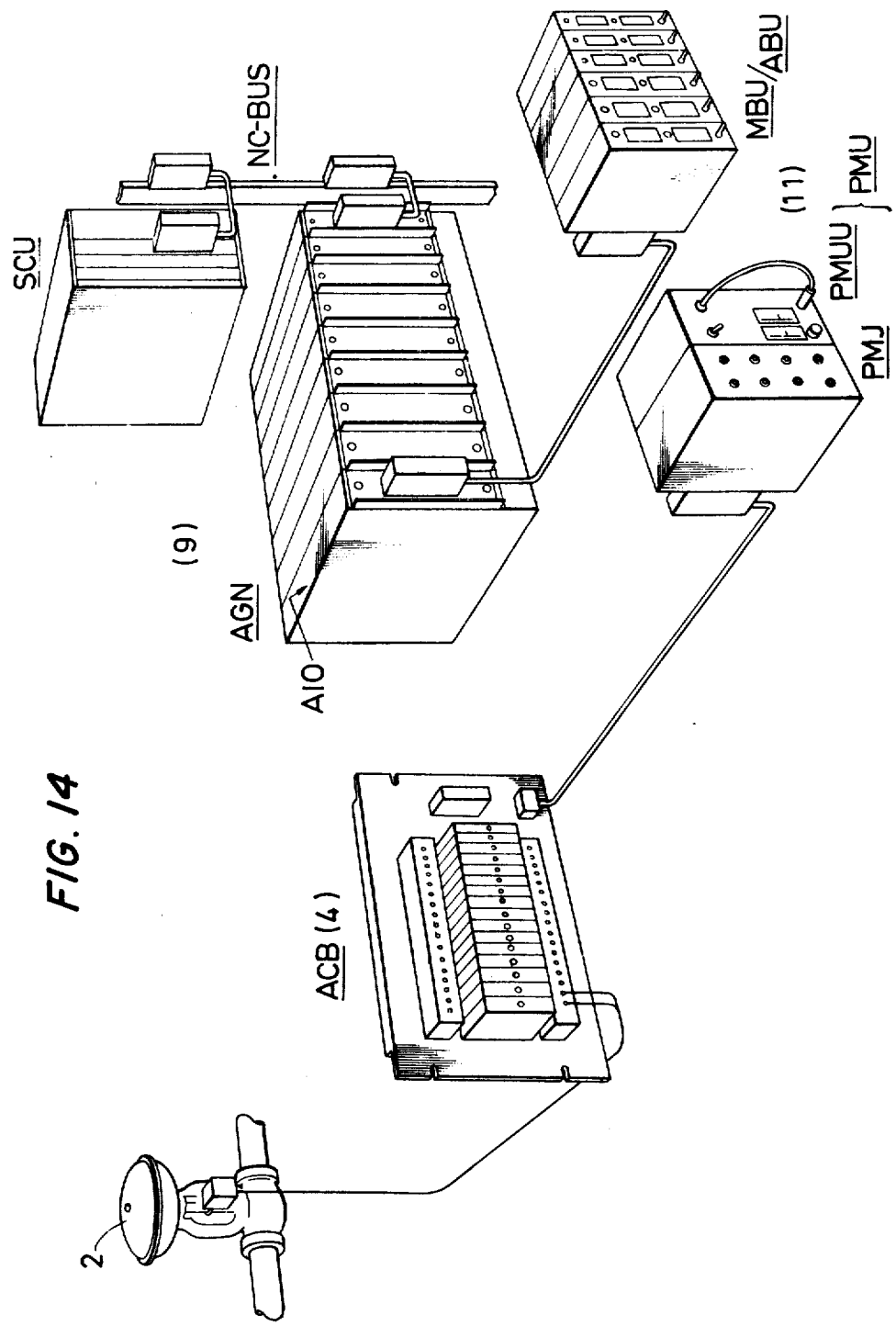
FIG. 14 illustrates the maintenance device of FIG. 12 positioned relatively to the other portions of the process control system.

The maintenance backup unit PMU operates in relation to the signal converter device 4, the analog converter AGN in the digital control device 9, and the manual/automatic backup unit MBU/ABU, interconnections between them being shown in FIG. 14. The maintenance backup unit PMU and the backup unit MBU/ABU are installed side by side. The backup unit MBU/ABU has input and output meters driven by P/V converters for indicating a pair of input and output signals of a control loop (FIG. 11), making it possible to manipulate the maintenance backup unit PMU in reference to indications on the output meter to duplicate the control called for by the SCU. Because jack leads from the individual signal converter units in the signal converter device 4 are converged at the jack selector unit PMJ as previously described, efficient servicing of a plurality of field elements may be accomplished through use of one maintenance signal control unit PMUU. A plurality of jack units PMJ may be installed depending upon backup control needs.

The maintenance backup unit PMU is operated in the following manner. The switch SW is first thrown to the BAL side, and the jack plug JP is plugged in a jack JK corresponding to the output signal converter unit to be serviced. As a result, an output current from the signal converter unit is supplied to the field control device or responder 2 through a path including line $a$, switch SW$_1$, output meter OM and line $b$. Current from the DC source CS flows through a path including switch SW$_2$, dummy resistor RL, and balance meter BM. Then, with the output current adjustment dial OB, the indication on the balance meter BM is brought into coincidence with that on the output meter OM, causing the current from the DC source CS to become equal to the output current from the output signal converter unit.

With the current levels thus balanced, the switch SW then is thrown to the M side, whereupon the output current from the signal converter unit returns to the signal converter unit by way of line $a$, switch SW$_2$, dummy resistor RL, balance meter BM and line $c$. The current from the DC source CS flows through switch SW$_1$, output meter OM, line $b$ responder 2, and line $c$. In this switch state, the responder 2 is operated by the output current from the maintenance unit PMU, permitting the signal converter unit to be serviced. After servicing, the data in the output register RGO of the input and output module in the analog converter unit AGN (FIG. 11) is adjusted by means of the manual/automatic backup unit MBU/ABU so that the output current of the converter unit indicated on the balance meter BM meets that of the maintenance unit PMU indicated on the output meter OM. Then the switch SW is thrown to the BAL side to allow the output current from the signal converter to be supplied to the responder 2. The jack plug JP is unplugged from the jack JK and servicing ends. The foregoing procedure is repeated for each different responder 2 which has circuitry needing servicing, merely by selecting the different jacks corresponding thereto.

In summary, the maintenance backup system of the present invention makes many advantages available, among which are:

(1) a plurality of process elements to be serviced are centralized at the jack selector unit PMJ, which simplifies connections between the maintenance backup unit PMU and a process element to be serviced and enhances service efficiency;

(2) the maintenance unit PMU is installed adjacent to devices, such as the manual/automatic backup unit MBU/ABU, having means for indicating the status of a controlled element in the system, thus enabling the most appropriate servicing to be done according to data available on the backup unit.

Although one preferred embodiment of the invention has been disclosed herein in detail, it is to be understood that this is for the purpose of illustrating the invention, and should not be construed as necessarily limiting the scope of the invention, since it is apparent that many changes can be made to the disclosed examples by those skilled in the art to suit particular applications.

We claim:

1. In a process control system of the type having a central station with a digital computer; said system including a plurality of field devices located remotely from said central station and including both field sensing devices for developing measurement signals reflecting process conditions such as temperature, and also field control devices responsive to control signals for affecting respective process variables such as fluid flow rate; and means interconnecting said field devices with said central station to provide said computer with data signals corresponding to said measurement signals, and to provide for sending to said field control devices control signals responsive to the digital output signals developed by said computer representing commands for said field control devices; said interconnecting means comprising:

(a) means at said central station responsive to said digital output signals for developing intermediate control signals of common format, each intermediate control signal serving to convey a command for a respective field control device;

(b) a plurality of signal converting units each assigned to a corresponding field control device and serving to transform the intermediate control signal for its assigned device to an analog control signal in the form of a variable current the magnitude of which represents the command for the respective field control device;

(c) a first plurality of analog signal transmission lines each connecting the output of a respective one of said converters to its corresponding field control device to provide for the actuation of that device in accordance with the magnitude of the corresponding analog control signal;

the system further including maintenance backup apparatus comprising:
(1) an analog signal generator located at said central station and operable to develop a manually-settable backup analog signal;
(2) a second plurality of analog signal transmission lines each assigned to a corresponding one of said field control devices;
(3) a selector unit for said analog signal generator including means for connecting said back-up analog signal to one end of any selected one of said second plurality of analog signal transmission lines assigned to a selected one of said field control devices; and
(4) switch means operable to interrupt the connection between the output of any said selected converter unit and the corresponding one of said first plurality of transmission lines, and to establish a connection between said corresponding one transmission line and the other end of said selected one of said second plurality of transmission lines, said settable backup analog signal thereby being transmitted from said analog signal generator to the particular field control device normally supplied with an analog control signal by said selected converter unit, whereby that selected converter unit can if necessary be removed for servicing while its assigned field control device is actuated by the analog backup signal from said signal generator.

2. A process control system as in claim 1, wherein said maintenance backup means further comprises:
meter means for comparing the magnitude of said backup analog signal with the magnitude of an analog control signal, so that the backup analog signal can be adjusted to match the analog control signal; and
connection means for connecting the output analog control signal of any selected one of said converter means to said meter means to provide for such comparison prior to operation of said switch means from a first condition, where said analog control signal from the selected converter unit flows to the corresponding field control device, to a second condition in which said backup analog signal is directed to said corresponding field control device.

3. A process control system as in claim 2, wherein said meter means comprises:
a first meter to which said analog control signal is directed; and
a second meter to which said backup analog signal is directed.

4. A process control system as in claim 3, wherein said converter units include first and second output terminals;
one of said output terminals being directly connected to a corresponding input terminal of the field control device corresponding to the converter unit assigned thereto;
a jack adapted to receiving a jack plug and having two normally-closed contact points;
the other of said output terminals being connected to the other field control device input terminal through the normally-closed connection between said two contact points;
said normally-closed jack connection being opened when a jack plug is inserted in said jack;
said maintenance backup means comprising a jack plug to be inserted in any of said jacks;
a pair of plug leads for said jack plug and which, when said plug is inserted in any of said jacks, are connected to said contact points respectively; and
means operable when said switch means is in said first condition for connecting said jack plug leads in a circuit including said first meter so that said first meter reads the magnitude of the corresponding analog control signal.

5. A process control system as in claim 4, including means operable, when said switch means is in said first condition, for directing the flow of current of said backup analog signal through said second meter, to provide a comparison with said first meter.

6. A process control system as in claim 1, wherein each of said converter units includes first and second output terminals and the corresponding field control device includes first and second input terminals;
means connecting said first output terminal to said first input terminal;
each of said second plurality of analog signal transmission lines having a set of three leads;
the first of said set of three leads of each of said second transmission lines being connected in common to the first output terminal of the corresponding converter unit and to the first input terminal of the corresponding field control device;
the second and third of each said set of transmission line leads being connected respectively to the first input terminal of the corresponding field control device and to the first output terminal of the corresponding converter unit;
means normally operable to short-circuit said second and third leads together to provide for flow of analog control signal current to the field control device from the assigned converter unit;
means operable to interrupt said short-circuit from any one of said sets of said transmission line leads; and
means to connect said backup analog signal to the corresponding field control device through said first and second leads of said one set of transmission line leads.

* * * * *